United States Patent [19]

Berger et al.

[11] 4,225,631

[45] Sep. 30, 1980

[54] ABRASION RESISTANT COATINGS FOR UNSATURATED POLYMERIC SUBSTRATES

[75] Inventors: Michael J. Berger, Cambridge; Hollis E. French, N. Chelmsford, both of Mass.

[73] Assignee: Itek Corporation, Lexington, Mass.

[21] Appl. No.: 678,089

[22] Filed: Apr. 19, 1976

[51] Int. Cl.$^2$ .................................................. B05D 3/06
[52] U.S. Cl. ........................................ 427/54.1; 427/36; 427/44; 427/164; 427/377; 427/387
[58] Field of Search ................... 427/44, 54, 164, 387, 427/36, 377; 428/447; 351/166

[56] References Cited

U.S. PATENT DOCUMENTS

| | | | |
|---|---|---|---|
| 3,457,221 | 7/1969 | Stengle | 428/447 X |
| 3,852,097 | 12/1974 | Owen et al. | 427/54 |
| 3,922,443 | 11/1975 | Brown et al. | 428/447 |
| 3,953,115 | 4/1976 | French et al. | 351/166 |

*Primary Examiner*—Bernard D. Pianalto

*Attorney, Agent, or Firm*—Homer O. Blair; Robert L. Nathans; David E. Brook

[57] ABSTRACT

A process is disclosed for applying an adherent, optically clear, abrasion resistant coating to polymeric substrates formed from unsaturated monomers. Typical substrates are lenses formed from either acrylic or allylic polymers, such as CR-39 lenses.

This process includes (a) forming a solution of a partially hydrolyzed vinyltri (lower alkoxy) silane, such as vinyltriethoxysilane, in a water-miscible, volatile, organic solvent, the silane being present from 25–75% by weight; (b) applying this solution to a clean surface of the substrate; (c) dehydrating the coated substrate under low humidity conditions at an elevated temperature below the temperature at which the substrate degrades; and, (d) then submitting the dehydrated coated substrate to irradiation with ultraviolet light or other high energy radiation until an adherent, abrasion resistant coating is formed.

18 Claims, No Drawings

ABRASION RESISTANT COATINGS FOR UNSATURATED POLYMERIC SUBSTRATES

BACKGROUND OF THE INVENTION

1. Field of the Invention

The invention relates to coatings for polymeric substrates formed from unsaturated monomers and more particularly to optically clear, abrasion resistant, adherent coatings particularly suitable for ophthalmic products such as CR-39 lenses.

2. Description of the Prior Art

Polymeric ophthalmic lenses have become increasingly popular recently due to their fine optical properties, dimensional stability, impact resistance, light weight, etc. One serious disadvantage, nevertheless, to polymeric ophthalmic lenses, has been their susceptibility to scratching, particularly compared to traditional glass lenses.

Much research has been devoted to providing coatings for polymeric lenses to improve their abrasion resistance. To date, however, none of the resultant coatings has proven totally successful as evidenced by their lack of commercial acceptance. This is probably because of the stringent requirements in optical and mechanical properties necessary in such coatings.

An example of one type of coating provided to solve this problem is given in U.S. Pat. No. 3,637,416 to Misch et al. The coatings described in the Misch et al. patent are applied by coating a plastic lens with a bonding or coupling film comprising an organic silicon compound and also coating it with a silica or silica gel. The preferred coating technique is a two-step technique, although both coatings can be applied simultaneously. Even in the one-step coating technique, however, the combination of both an organic silicon compound and a silica or silica gel forming compound is present.

Still other attempts are described in U.S. Pat. No. 3,713,880 to Krekeler et al. The coatings described by this patentee contain alkyl silicates, trifunctional and/or bifunctional organosilanes and antistatic additives.

Abrasion resistant ophthalmic coatings formed from vinyltri(lower alkoxy)silanes are also described by French et al. in Ser. No. 376,505, filed July 5, 1973.

Despite the large amount of prior research, there is still a need for a process of forming optically clear coatings on polymeric substrates which have even better scratch resistance and adhesion.

SUMMARY OF AN EMBODIMENT OF THE INVENTION

An embodiment of this invention relates to a process by which abrasion resistant, adherent coatings can be applied to polymeric substrated formed from unsaturated monomers. Successful coatings require careful control of narrowly defined parameters relating to both the compositions used and the coating techniques employed.

In the first step of the process, a solution of a partially hydrolyzed vinyltri(lower alkoxy)silane is formed using 25-75% by weight of the silane in a water-miscible, volatile, organic solvent. A preferred solution comprises about 50% of vinyltriethoxysilane in ethanol, partially hydrolyzed by adding small amounts of a slightly acidic aqueous solution, and allowing this solution to stand for a sufficient period of time, such as three hours. The coating solution also usually contains an abrasion-resistance enhancer, such as gamma-aminopropyltrimethoxysilane, and a stabilizing weak acid.

A coating of this solution is applied uniformly to a substrate which is clean. Optionally, the coated substrate is maintained in a high humidity environment to further hydrolyze the silane. Subsequently, the coating is dehydrated at an elevated temperature under dry conditions.

An essential step of this process is irradiation of the coated substrate with ultraviolet light or other high energy radiation. This step must be performed after dehydration to achieve the optimum increases in abrasion resistance and adhesion which are possible with such irradiation.

The coating process and the resultant coated substrates described herein have significant advantages over those previously known in the prior art. For example, the coatings produced have outstanding adhesion to the substrate, often being capable of withstanding immersion in boiling water for one hour, or low temperatures such as −40° C. on the other hand. The coatings are economical and easy to apply, e.g. they can even be dip or spray coated. A desirable feature of these coatings is their compatibility with many dyes which can be used to tint lenses. The dyes can be added to a common solvent which results in greatly simplified tinting procedures. A most significant advantage, of course, is the outstanding toughness, adhesion, optical clarity and abrasion resistance which characterizes the coatings produced.

DESCRIPTION OF THE INVENTION

Silane compounds suitable for producing the coatings described herein are vinyltri(lower alkoxy) silanes. Lower alkoxy includes methoxy, ethoxy or propoxy, i.e., $C_1$–$C_3$ alkoxy. The alkoxy groups can be the same, but need not be. Above $C_3$ alkoxy, the silanes are not sufficiently volatile or water miscible and are too shielding about the Si—O bond which tends to interfere with hydrolysis.

Suitable silanes can be represented by the following structural formula:

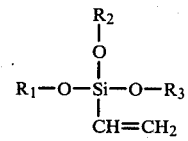

wherein $R_1$, $R_2$ and $R_3$ are individually selected from $C_1$–$C_3$ alkyl groups.

The silane is dissolved in a solvent in an amount of from about 25% to about 75% by weight and preferably in an amount around 50%. The amounts are based on the original, unhydrolyzed solution. As a general proposition, it is desirable to have just enough solvent to create one homogeneous phase to achieve the highest concentration of coating components consistent with good coating characteristics.

Preferred solvents are water miscible, lower molecular weight ($C_6$ or less), organic solvents. Included are such compounds as methanol, ethanol, propanol and isopropanol. Absolute ethanol is a preferred solvent because of its volatility, cost and ready miscibility with both phases. In choosing a solvent, those skilled in the art will recognize that a balance is made between volatility and water miscibility on the one hand, and ability to dissolve the silane on the other hand.

Certain solvents having low miscibility water, such as benzene, can also be used, but certain adjustments have to be made.

The silane solution is partially hydrolyzed before it is coated on the ophthalmic substrate to achieve the desired coatingrheology and proper hardening conditions. This can be accomplished by adding a slightly acidic solution to the silane solution, the acid acting to catalyze hydrolysis. For example, from about 7 to about 30 parts of 0.001 to 0.1N hydrochloric acid can be used per hundred parts of silane solution. Other dilute acids such as sulfuric, nitric, acetic, etc., can also be used.

The amount of hydrolysis desirable at this point is that which results in a desirable coating rheology and produces good ultimate hardness. A viscosity of about 5 centipoises, for example, has been found to be very suitable for spray coating. When the lens is coated, it is also desirable to have the coating quickly becomes "dust dry", i.e., dust will not stick to the surface thereof. This facilitates handling of the lens during subsequent processing.

Abrasion-resistant enhancers, although not necessary, are customarily used to speed the hardening process of the partially hydrolyzed coatings. Such enhancers serve to perform several functions including: improving hardness of the cured coating; improving adhesion of the cured coating; and decreasing cure time. Suitable enhancers include amino-($C_1$ to $C_8$ alkyl)tri ($C_1$ to $C_3$ alkoxy)silanes, such as aminopropyltriethoxysilane, and N(beta-amino ethyl)-gamma-aminopropyltrimethoxysilane. It is believed that other amines would also be suitable. From about 1 to about 20 parts by weight, and preferably about 5–15 parts, per 100 parts of the coating solution are used. Above about 20 parts, it has been noticed that abrasion resistance falls off while amounts below about 1 don't substantially expedite cure time. Cure times stated herein are those wherein such enhancers are used.

When abrasion-resistance enhancers are added, another ingredient which is used is one or more stabilizing weak acids. These are acids having a Ka of between about $5 \times 10^{-3}$ and about $5 \times 10^{-5}$. It is believed that such acids temporarily interfere with the abrasion-resistance enhancer to prevent rapid build-up in viscosity of the coating solution prior to coating. Thus, one advantage to the use of such acids is rheological stability of the coating solution. Another is that more of the solvents in the solution are given time to evaporate before the coating gels which provides a higher level of abrasion resistance in the final coating. Acids with a pKa of higher than $5 \times 10^{-3}$ are too strong and do not provide enough reversibility in their effect whereas acids having a pKa of lower than $5 \times 10^{-5}$ are too weak and don't seem to dissociate enough to prevent the enhancer from causing a rapid viscosity rise in the coating solution. The preferred stabilizing weak acids are those acids having relatively high volatility such as acetic acid. Non-volatile acids can also be used, but have to be neutralized in situ prior or during coating. The stabilizing weak acid is added in at least an amount of 0.05 parts/part enhancer, and preferably in an amount of from about 0.1 part to about 0.5 parts per part enhancer.

Before the polymeric substrate is coated, it is usually desirable to clean it. The technique used is not as important as the result. Some cleaning solvents such as acetone and various other ketones can be used. Flame cleaning can also be used, as can oxygen-containing plasmas such as helium-oxygen plasma. The preferred method of cleaning is to brush the substrate with fine nylon bristles in a detergent solution. Of course, if the substrate surface were absolutely clean, such as might be the case with a brand new lens in a clean environment, cleaning may not be necessary.

The substrates can be coated with the hydrolyzed solution by standard techniques such as spin coating, spray coating, dip coating, etc. Coating thicknesses, as applied wet, typically range from about 0.5 to 25 microns and are preferably in the range of from about 3 to about 12 microns for lenses. The preferred dry coatings for lenses are about 1.5–6 microns thick. It is important, of course, to provide an even, uniform coating on most optical substrates, particularly ophthalmic lenses.

Coated substrates are optionally further hydrolyzed in a high humidity environment, such as one having a relative humidity of equal to or greater than about 50% at a temperature in the range of from about 22° C. to about 80° C. Temperatures below about 22° C. result in much slower times, whereas temperatures above about 80° C. result in final coatings with poorer physical properties including abrasion resistance. The time of reaction in the high humidity environment will vary with the temperature, thickness, coating ingredients, exact relative humidity, etc. At 40° C. and with a 2–3 micron initial coating, a period of about 24 to 30 minutes has been found suitable. The preferred temperature range is from about 30° to about 50° C. because these temperatures produce coatings having outstanding abrasion resistance in reasonably short processing times. At the end of this hydrolysis treatment, it is believed that the great majority of Si—O—R bonds have gone to or through the Si—O—H stage either prior to or at the completion of this step.

As stated, further hydrolysis at an elevated temperature is entirely optional. In fact, sufficient hydrolysis often occurs if the coated substrates are allowed to remain for any appreciable period of time in the ambient atmosphere as long as the relative humidity is fairly high. This is usually the case, for example, on warm, humid summer days.

The substrate with its hydrolyzed coating is now dehydrated at an elevated temperature and low humidity conditions to form a silica-like network having Si—O—Si bonds. Preferred humidities are below 10% relative humidity, and particularly preferred are those of less than 1% such as those found in drying ovens. The lower temperature limit is established by practical cure times, and the upper limit is established by the thermal stability of the plastic substrate. With polymerized CR-39 lens substrates, it has been found that temperatures from about 70° to about 100° C. and cure times of between about 2 and 200 hours are satisfactory. Preferably, the temperatures are 80°–100° C., which normally result in dehydration times of about 5–8 hours. Above about 100° C., it has been found that CR-39 lenses tend to yellow. Other substrates can withstand higher temperatures, however. In this dehydration step, it has been noted that the surface hardness appears first, followed by adhesion to the polymeric substrate.

After dehydration, the coated substrate is subjected to high energy electromagnetic or nuclear radiation. Ultraviolet light, high energy electrons and gamma rays are all suitable. Because of the low cost and ease with which it can be obtained and handled, ultraviolet light is preferred.

The intensity of the ultraviolet light flux can vary widely. In general, more intense fluxes provide shorter curing times whereas less intense fluxes require longer curing times. For wavelengths in the 220–400 nanometer range, intensities of from about one watt to about 1000 watts of radiated power are sufficient. About 5–100 watts are preferred with wavelengths in the range of about 280–400 nanometers because these are obtainable with sunlamps; therefore, highly specialized equipment is not required. Very high power sources generate too much heat and also require specialized equipment. One specific lamp which has been found satisfactory, used either alone or in combinations of up to three lamps, is the G.E. RS 275 watt sunlamp, which has an output of 2500 lumens with 5 watts of radiated power and wavelengths of 280–400 nanometers.

It has been found essential to perform the irradiation step subsequently to the dehydration step. While the reasons for this are not entirely understood, it is believed that the increased abrasion resistance and adhesion realized as a result of irradiation is produced by a radical reaction. This could be initiated by absorption of energy by the polymer substrate itself, or residual initiator such as peroxides in the substrate, or impurities in the substrate introduced during manufacture, or impurities in the coating introduced during application. The absorbed energy could create active radicals which cause crosslinking of vinyl groups with the coating and between the coating and substrate. These might produce a harder coating and increased chemical adhesion between the coating and substrate. Sufficient dehydration of the coating and condensation of the siloxane polymer network, prior to irradiation, is apparently necessary to have the irradiation produce its optimum effect. Proper orientation of unsaturated groups during dehydration may be occurring, and such orientation would appear to maximize the desired crosslinking.

In the case of ophthalmic lenses, particularly those formed from polymerized diethylene glycol bis(allyl carbonate), known as CR-39, some care must be exercised so that the lenses are not irradiated for excessively long times. Prolonged irradiation is known to degrade such polymers as well as the coating, by mechanisms well known in the art. Often, such degradation causes yellowing, which is clearly undesirable for ophthalmic lenses.

It is believed that the irradiation step described herein will be effective in improving the abrasion resistance of vinyltri(lower alkoxy)silane coatings on all polymeric substrates which are formed from monomers which contain unsaturated groups, such as vinyl or allylic groups. These coatings are particularly useful, of course, with ophthalmic polymers. Some suitable ophthalmic substrates include substrates formed from homopolymers or copolymers of CR-39, diethylene glycol bis(allyl carbonate) sold by PPG Industries, or acrylic polymers such as polymethyl methacrylate.

An additional optional ingredient comprises a solvent soluble dyestuff. In fact, this can be a unique advantage of the coating solutions described herein since many dyestuffs are soluble in the same solvents used for the silanes and are also chemically compatible with the partially reacted silanes. This is a great advantage in forming tinted lenses since the dyes used can be uniformly distributed in the coating solutions. Examples of such dyes include:

DuPont Luxal Fast Yellow T
DuPont Luxal Fast Blue MBSN
BASF Spirit Soluble Fast Blue H&L
Sandoz Acetosol Blue GLS
Ciba Orasol Red B
Ciba Orasol Red 2B
Ciba Orasol Yellow GN
Ciba Orasol Black CN.

Still another optional additive is one or more compatible leveling agents. These can be added in very small concentrations to optimize the coatings.

In some cases, the expansion coefficient of the polymeric substrate may cause the cured coating to craze. In such cases, it is helpful to add to the coating solution small amounts, such as about 1–5%, of propyltriethoxysilane, hydrolyzed in the same manner as the vinyltri(lower alkoxy)silane, to overcome this problem. Although such coatings usually have slightly inferior abrasion resistance, they are superior in flexibility and craze resistance.

The following examples further illustrate the invention.

EXAMPLE 1.

Purified vinyltriethoxysilane was obtained by distillation from a mixture of potassium carbonate and vinyltriethoxysilane obtained under the tradename A-151 from Union Carbide under moisture-free conditions. The fraction which came over at 153°–154° C. was collected.

A solution of silane was then formed from:
Purified vinyltriethoxysilane: 188 grams
Absolute ethanol: 200 cc
0.1N Hydrochloric acid: 60 cc.
This solution was allowed to stand in a stoppered container for about three hours to achieve an appropriate degree of hydrolysis.

A coating solution was then prepared from:
Hydrolyzed vinyltriethoxysilane solution: 240 cc
Absolute ethanol: 42 cc
n-Hexylcellosolve: 240 cc
Concentrated acetic acid: 8 cc
Gamma-aminopropyltriethoxysilane: 40 cc.
Gamma-aminopropyltriethoxy silane was obtained from Union Carbide under the tradename A-1100 and was purified by distillation with the fraction that distilled off at 220° C. being collected. n-Hexylcellosolve impurities were removed prior to its addition using an alumina column.

The coating solution was applied to a Univis® CR-39 plastic lens by spray coating after which the coated lens was exposed to a high humidity environment (80% relative humidity, 45° C.) for 30 minutes and dehydrated in an oven at 88° C. for 36 hours. An adherent coating resulted which was optically clear and had better abrasion resistance than the uncoated lens surface, requiring three rubs with 0000 steel wool under firm thumb pressure (estimated to be about 20 psi) to abrade the coated substrate to the same extent as one rub on the uncoated substrate.

EXAMPLE 2.

A coating solution was prepared following the procedure described in Example 1. This solution was spray coated onto several Univis® CR-39 plastic lenses, which were subsequently placed in a humid environment for a short period of time. After this, some coated lenses were subsequently dehydrated in an oven at 88°

C. for 24 hours while others were maintained under the same conditions for 36 hours. All lenses were subjected to ultraviolet light from three G.E. RS4 275 watt sunlamps at a distance of 10″ from the lenses and an ambient temperature of 35° C. for various times. Abrasion resistance was then determined by recording the number of rubs required with 0000 steel wool under firm thumb pressure to impart noticeable damage to the coated lenses. The results were:

| Dehydration Time at 88° C. | Number of rubs to impart noticeable damage after ultraviolet treatment for stated hours | | |
|---|---|---|---|
| | 0 | 7 | 24 |
| 24 | 1 | 3 | ≦150 |
| 36 | 2 | 40 | ≦150. |

EXAMPLE 3.

A coating solution prepared following the procedure of Example 1 was spray coated onto a Univis ® CR-39 lens. After being left in a high humidity environment for a short time and dehydrated in an oven at 88° C. for 36 hours, the coated lens had an abrasion resistance which was not much better than the uncoated lens substrate. Two-three rubs with 0000 steel wool under firm thumb pressure produced noticeable damage.

The same coated lens was subsequently placed 1″ from a G.E. RS4 275 watt sunlamp at an ambient temperature of 75° C. After only three hours of this treatment, the lens had acquired an abrasion resistance comparable to those of lenses irradiated with ultraviolet light for 24 hours at 35° C. and placed 10″ from three G.E. RS4 275 watt sunlamps.

EXAMPLE 4.

A coating solution prepared following the procedure of Example 1 was spray coated onto a Univis ® CR-39 lens and humidified for a short time. Dehydration at an elevated temperature was omitted. The coated lens was subsequently irradiated with ultraviolet light by placing it 10″ from three G.E. RS4 275 watt sunlamps at an ambient temperature of 35° C. for 18 hours. The coating produced exhibited poorer abrasion resistance than the uncoated substrate. Subsequent dehydration at 88° C. for 24 hours did not significantly improve this abrasion resistance.

EXAMPLE 5.

A coating solution was prepared following the procedure of Example 1 and spray coated onto a polycarbonate safety lens. The coated lens was placed in a high humidity environment at 80% relative humidity at 45° C. for 30 minutes. Subsequently, the coated lens was dehydrated at 88° C. for 36 hours and irradiated for 24 hours with ultraviolet light from three G.E. RS4 275 watt sunlamps positioned 10″ from the coated lens at an ambient temperature of 35° C. The resultant coatings had very poor abrasion resistance compared to those formed with the same solution applied in the same manner to CR-39 lens substrates.

EXAMPLE 6.

CR-39 flats obtained from American Acrylics and Plastics were spray coated with a coating solution prepared according to Example 1. The coated flats were dehydrated at 88° C. for 36 hours. Some of the coated flats were then exposed to ultraviolet light by placing them 10″ from three G.E. RS4 275 watt sunlamps at 35° C. ambient. Abrasion resistance for all flats was measured using a Taber abrader and following ASTM procedure D1044. Haze was measured using ASTM procedure D1003-61, modified by ASTM procedure D1044-73. The results are shown below expressed as percent haze after abrasion, and higher haze correlates with poorer abrasion resistance:

| Sample | Percent Haze |
|---|---|
| Uncoated | 3.7–6.4 |
| Coated, dehydrated | 2–4 |
| Coated, dehydrated, and UV treatment | 0.8–1.0. |

EXAMPLE 7.

Two partially hydrolyzed silane solutions were prepared as follows:

| Part A. | |
|---|---|
| Purified vinyltriethoxysilane | 94 grams |
| Absolute ethanol | 100 cc |
| 0.1N Hydrochloric acid | 60cc. |
| Part B. | |
| Purified propyltriethoxysilane | 5.4 grams |
| Absolute ethanol | 5.0 cc |
| 0.1N Hydrochloric acid | 1.5 cc. |

These solutions were allowed to stand separately in stoppered bottles for three hours.

A coating solution was formulated from these solutions by combining the following:
Part A: 133 cc
Part B: 7 cc
n-Hexylcellosolve: 120 cc
Glacial acetic acid: 4 cc
Purified gamma-aminopropylmethoxysilane: 20 cc.
This coating solution was stable and could be used for up to five days after mixing. Propyltriethoxysilane imparts flexibility to the coatings which helps prevent crazing during processing; it does have somewhat of an inhibiting effect, however, on hardening under ultraviolet irradiation. The coating solution was spin coated onto a Univis ® CR-39 lens which was then dehydrated for 24 hours at 88° C. One or two rubs with 0000 steel wool produced visible damage. After 17 hours of ultraviolet treatment as described in Example 6, abrasion resistance increased only slightly to the point where it took 5 rubs to produce noticeable damage.

EXAMPLE 8.

CR-39 flats were spray coated with a coating solution of Example 1 and the coated flats were dehydrated and irradiated with ultraviolet light following the procedures of Example 6. A modified ASTM-D-3002 procedure was used to test coating adhesion. Eleven parallel cuts, 1/16th inch apart were made with a razor blade. A second similar set of cuts 90° to the first was then made. A device was constructed which made it possible to make all 11 cuts at the same time. Adhesive tape #610 (3M Co.) was firmly placed onto the grid area. The tape was then pulled at an angle of 90° from the surface and the percent removed was calculated from the number of squares removed by the tape.

0% was removed by this test, showing excellent adhesion of the ultraviolet light cured coatings. Coated lenses were also boiled in water for 1 hour and the adhesion test was repeated. 0% was again removed, even after the boiling water treatment. Thus, although treatment with ultraviolet light is known in some circumstances to cause delamination or adhesion failure, it did not appear to have this result for the coatings and substrate described herein.

EXAMPLE 9.

The silane solution of Example 1 was used. This was divided into two parts, and in one part only, 2% by weight of Ciba-Geigy Orasol Black CN dye was added. The dyed solution was stirred overnight, and filtered through glass filter paper the following morning. The dyed solution was used in combination with the undyed solution to achieve a wide variety of optical densities of up to about 1.5 when the combined solutions were coated onto the surface of a CR-39 plastic lens. The gray achieved was consistent with neutral density standards in the ophthalmic industry. Further, the gray color was not degraded during subsequent UV treatment.

EXAMPLE 10.

A solution, suitable for application to a lens surface by spin coating, was prepared using the hydrolyzed solution of Example 1 in the following coating solution:
Hydrolyzed vinyltriethoxysilane solution: 240 cc
Absolute ethanol: 40 cc
n-Hexylcellosolve: 25 cc
Concentrated acetic acid: 8 cc
Gamma-aminopropyltriethoxysilane: 40 cc
SF 1023 (a silicone furface active agent from GE): about 5 drops.

Those skilled in the art will know, or be able to ascertain using no more than routine experimentation, many equivalents to the specific embodiments expressly described herein. These are within the scope of this invention and are intended to be covered by the appended claims.

What is claimed is:

1. A process for forming an abrasion-resistant, adherent coating on a polymeric substrate formed from monomers which contain unsaturated groups, comprising:
    a. forming a solution of hydrolyzed vinyltri(lower alkoxy)silane in a water-miscible, volatile, organic solvent wherein said vinyltri(lower alkoxy)silane is present from about 25 to about 75 weight percent;
    b. applying a coating of said solution to a clean surface of the polymeric substrate;
    c. dehydrating the coated substrate at an elevated temperature; and,
    d. subsequently subjecting the dehydrated coated substrate to high energy radiation until an adherent, coating having significantly improved abrasion-resistance is formed thereon.

2. A process of claim 1 wherein said substrate is formed from a polymeric material containing a major amount of diethylene glycol bis(allyl carbonate).

3. A process of claim 2 wherein said substrate is an ophthalmic lens.

4. A process of claim 3 wherein said vinyltri(lower alkoxy)silane comprises vinyltriethoxysilane.

5. A process of claim 4 wherein said coated lens is dehydrated in an atmosphere having a relative humidity below about 10% and a temperature between about 80° C. and about 100° C.

6. A process of claim 5 wherein said water-miscible, volatile, organic solvent is ethanol.

7. A process of claim 6 wherein said vinyltriethoxysilane is present in said solution in an amount of about 50%.

8. A process of claim 1 wherein said solution of hydrolyzed vinyltri(lower alkoxy)silane contains from about 1 to about 20 weight percent of an abrasion-resistance enhancer.

9. A process of claim 8 wherein said abrasion-resistance enhancer comprises an amino($C_1$-$C_8$ alkyl) tri($C_1$-$C_3$alkoxy)silane.

10. A process of claim 9 wherein said abrasion-resistance enhancer comprises gamma-aminopropyltriethoxysilane.

11. A process of claim 8 also containing at least about 0.05 parts of a stabilizing weak acid per part of abrasion-resistance enhancer.

12. A process of claim 11 wherein said stabilizing weak acid is acetic acid.

13. A process of claim 12 wherein said abrasion-resistance enhancer is gamma-aminoproplytriethoxysilane.

14. A process of claim 13 wherein said vinyltri(lower alkoxy)silane comprises vinyltriethoxysilane.

15. A process of claim 14 wherein said polymeric substrate is formed from a polymer material containing a major amount of diethylene glycol bis(allyl carbonate).

16. A process of claim 15 wherein said polymeric substrate is an ophthalmic lens.

17. A process for producing an abrasion-resistant, adherent, optically clear coating on an ophthalmic lens formed from diethylene glycol bis(allyl carbonate), comprising:
    a. forming a coating solution containing from about 25 to about 75 percent by weight of a hydrolyzed vinyltri(lower alkoxy)silane in a water-miscible, volatile, organic solvent, said coating solution also containing from about 1 to about 20 percent by weight of an amino ($C_1$-$C_8$ alkyl)tri($C_1$-$C_3$)alkoxysilane and from about 0.1 to about 0.5 parts of a stabilizing weak acid having a pKa of between about $5 \times 10^{-3}$ and about $5 \times 10^{-5}$ per part of amino($C_1$-$C_8$ alkyl) tri($C_1$-$C_3$)alkoxysilane, by weight;
    b. applying a coating of said solution to a clean surface of said lens;
    c. dehydrating the coated lens at a temperature of between about 70° C. and 100° C; and,
    d. subsequently irradiating the dehydrated, coated lens with ultraviolet light until an adherent, optically clear coating having significantly improved abrasion-resistance is formed.

18. A process of claim 17 wherein said vinyltri-(lower alkoxy)silane is vinyltriethoxysilane and wherein said solvent is ethanol.

* * * * *